United States Patent [19]
Wing

[11] Patent Number: 5,570,373
[45] Date of Patent: Oct. 29, 1996

[54] METHOD AND APPARATUS FOR TESTING A RADIO IN A BASE STATION WITHOUT USING A RADIO TEST UNIT

[75] Inventor: Thomas E. Wing, Mendham, N.J.

[73] Assignee: Lucent Technologies Inc., Murray Hill, N.J.

[21] Appl. No.: 407,728

[22] Filed: Mar. 20, 1995

[51] Int. Cl.$^6$ .................................................... G06F 11/00
[52] U.S. Cl. .......................... 371/5.1; 370/13; 455/67.1; 455/54.1
[58] Field of Search ........................... 371/5.1, 5.2, 25.1, 371/62; 370/13, 17, 13.1, 14, 95.1, 95.3; 375/224; 379/110, 113; 455/67.1, 67.7, 54.1

[56] References Cited

U.S. PATENT DOCUMENTS

| | | | |
|---|---|---|---|
| 4,688,207 | 8/1987 | Yoshimoto | 370/13 |
| 5,280,503 | 1/1994 | Betts et al. | 375/121 |
| 5,327,437 | 7/1994 | Balzer | 371/25.1 |

Primary Examiner—Robert W. Beausoliel, Jr.
Assistant Examiner—Phung Chung

[57] ABSTRACT

Testing of the operation of a radio in a base station of a wireless communication network may be achieved without removing the radio from service and without utilizing a separate test radio. Data concerning call processing activities are collected during wireless communications. A failure condition on an overhead or traffic channel of a radio is identified by suitably accessing the collected data, processing the data and then comparing the results to expected values.

49 Claims, 6 Drawing Sheets

METHOD AND APPARATUS FOR TESTING A RADIO IN A BASE STATION WITHOUT USING A RADIO TEST UNIT

FIELD OF THE INVENTION

This invention relates generally to the testing and maintenance of a radio in a base station of a wireless communication network. More particularly, the present invention concerns a radio testing technique that involves monitoring call processing activities that ordinarily occur in the course of wireless communications and determining whether those activities are consistent with the activities expected.

BACKGROUND OF THE INVENTION

Wireless communication typically involves the transmission of information between a mobile station, such as a cellular telephone, pager or wireless local loop terminal, and a cell or base station which is connected to a switched telephone network, such as a local or long distance exchange carrier. Highly complex radios in a base station operate over overhead channels to establish and maintain a communication linkage to a mobile station and over traffic channels to transmit and receive information, such as voice signals, to and from the mobile station once a communication linkage is established.

A separate radio test unit (RTU) is typically included in each base station of a wireless communication network, such as a time division multiple access (TDMA) or an analog Advanced Mobile Phone Service (AMPS) network, for purposes of testing a radio in the respective base station. Testing of a radio is performed indirectly by removing the radio from service, and then using the RTU included in the base station for identifying a failure condition in the radio.

The high maintenance costs associated with indirectly testing a radio using an RTU do not, in practice, permit frequent testing of radios in base stations of a wireless network. It is very costly to remove a radio from a base station, test the radio and then replace the radio within the base station after testing, assuming the radio does not contain a failure condition that requires repair. Too infrequent testing of a radio, however, may result in a failure condition not being identified for an extended period time, thereby causing lost revenue to the wireless communication service provider and poor service to the customer.

Further, it is foreseen that the cost of manufacturing an RTU for inclusion in a base station will become an increasingly larger proportion of the entire cost of the base station, as technological advances continuously reduce the size of other base station components. Moreover, it is also expected that the cost of developing, testing and maintaining the extensive and complex software required for performing radio testing using an RTU will continue to rise with the development of newer and more complex wireless communication networks.

SUMMARY OF THE INVENTION

The present invention provides method and apparatus for identifying a failure condition in a radio of a base station of a wireless communication network by the evaluation of detailed statistical data concerning call processing activities associated with wireless communications in the network.

In accordance with the present invention, detailed statistical data concerning selected call processing activities are suitably collected and stored in memories of the mobile and base stations, respectively, of a wireless network during the course of a wireless communication, such as a wireless telephone, paging or wireless local loop call, without removing a radio under test from service. These data may then be accessed for processing and comparison to expected values to provide for identification of whether a radio which is included in a base station of that network is operating properly with respect to either overhead or traffic channel operation.

In one embodiment, data concerning selected call processing activities are suitably collected at a mobile station or a base station during the course of a wireless communication and then provided to a processor which is included in a base station containing a radio under test.

In an alternative embodiment, base stations in a wireless network provide to a separate, external processor data concerning selected call processing activities which are suitably collected at mobile stations and transmitted to the base stations, and also collected at the base stations themselves, during the course of wireless communications.

The many advantages of the present invention will be readily apparent from the detailed description and the drawings that follow.

DETAILED DESCRIPTION

Advanced wireless communication networks, such as, for example, the digital Code Division Multiplex Access (CDMA) network, are operated in conformance with communication protocols requiring and enabling base stations and mobile stations, along with other wireless network elements, to monitor in detail call processing activities that typically occur during the course of wireless communications. See TR45 Mobile Station-Base Station Compatibility Standard for Dual-Mode Wideband Spread Spectrum Cellular System PN-3118 (to be published IS-95) (Unofficial Ballot Version) §§6.4.4, 6.4.5, 7.4 and 7.6, (Mar. 15, 1993), incorporated by reference herein, for a description of the call processing activities which are monitored for purposes of establishing communication linkages in a CDMA network.

In accordance with the present invention, the data concerning call processing activities which are typically collected, and may additionally be collected, during wireless communications are accessed to provide for efficient and economical testing of the operation of radios in the base stations of such networks.

Figure 1:
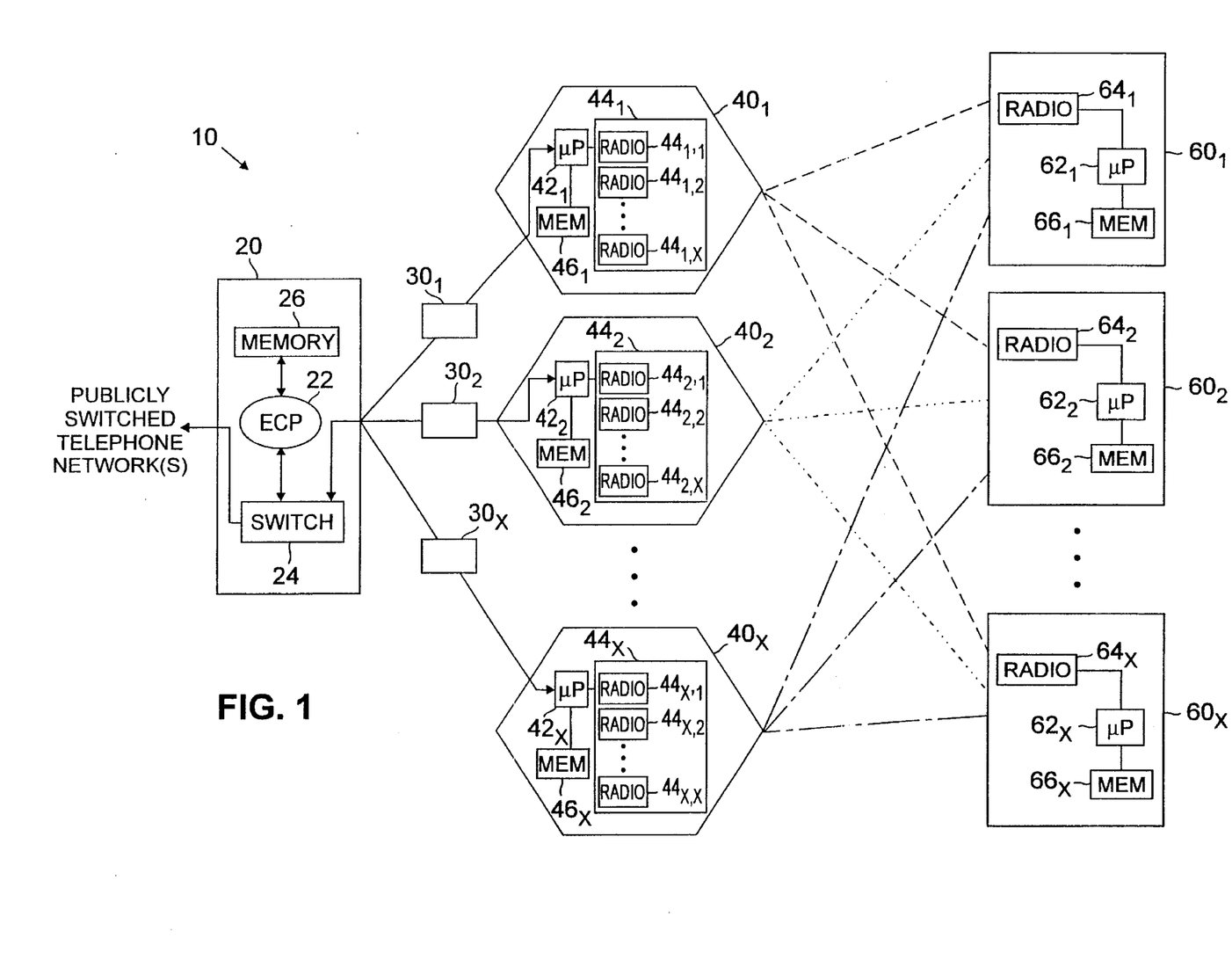
FIG. 1 illustrates an exemplary wireless communication network in which data concerning call processing activities associated with wireless communications may be collected, stored and accessed for purposes of testing a radio in a base station of the network according to the present invention.

FIG. 1 shows an exemplary wireless communication network 10 comprising a mobile switching center (MSC) 20, a plurality of base stations $40_{1,2\ldots x}$ and a plurality of mobile stations $60_{1,2\ldots x}$. By way of example, the operation and structure of the components in the network 10 are explained below with reference to particular features of the communication linkage protocol IS-95 associated with a CDMA network. It is to be understood that other presently existing wireless networks, such as TDMA and analog AMPS networks, may be configured by one skilled in the art to operate in conformance with a protocol which similarly requires and allows for the collection and storage of data concerning call processing activities, and that these data may be advantageously accessed for testing a radio in those networks in accordance with the inventive technique explained below.

The MSC 20 suitably includes an executive cellular processor unit (ECP) 22 connected to a cellular switch 24 and a memory 26. The plurality of base stations $40_{1,2\ldots x}$ comprises a plurality of microprocessor units $42_{1,2\ldots x}$ connected to a plurality of radio modules $44_{1,2\ldots x}$ and a plurality of memories $42_{1,2\ldots x}$, respectively. The plurality of radio modules $42_{1,2\ldots x}$ suitably comprise at least one group of a plurality of radios $42_{i,j}$, respectively. For example, the radio module $42_1$ may comprise the radios $42_{1,1}$, $42_{1,2}$ .. $42_{1,x}$. The plurality of mobile stations $60_{1,2\ldots x}$ comprises a plurality of microprocessor units $62_{1,2\ldots x}$ connected to a plurality of mobile radios $64_{1,2\ldots x}$ and a plurality of memories $66_{1,2\ldots x}$, respectively.

A plurality of transmission facilities $30_{1,2\ldots x}$ connect the plurality of microprocessor units $42_{1,2,\ldots x}$, respectively, to the cellular switch 24. The cellular switch 24 also is typically connected to one or more publicly switched telephone networks, such as a local or long distance exchange carrier, not shown.

Figure 2A:
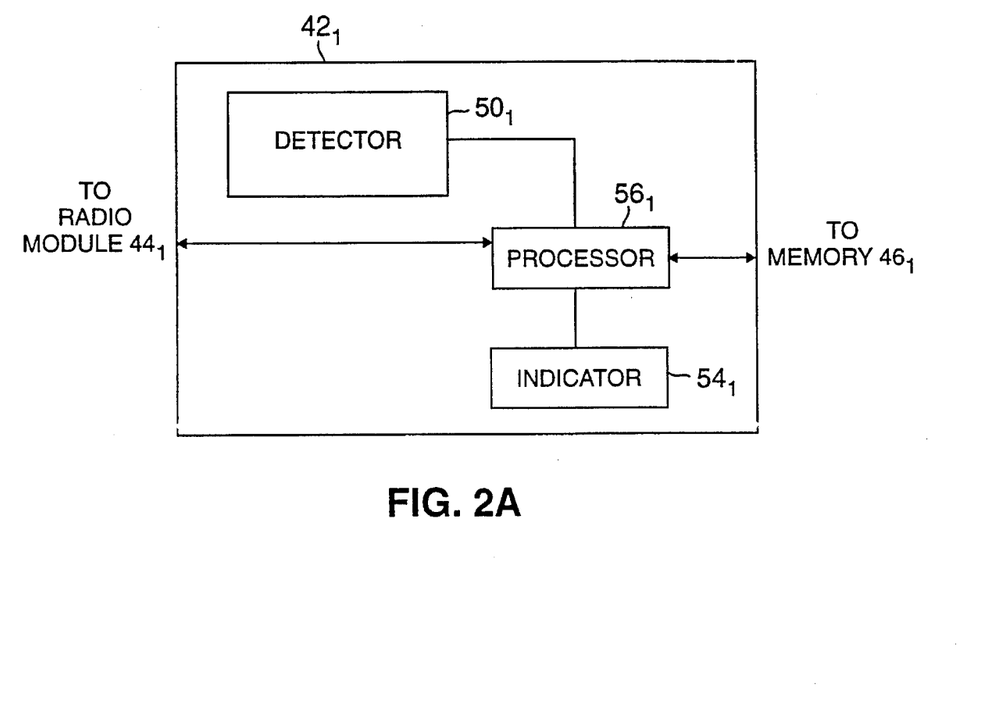
FIG. 2A illustrates a microprocessor unit of a base station including components for performing functions which implement the features of the present invention.

FIG. 2A shows an exemplary embodiment of the microprocessor unit $42_1$ as individual functional blocks. The functions these blocks represent may be provided for through the use of either shared or dedicated hardware, including but not limited to hardware capable of executing software. In a preferred embodiment, the microprocessor unit $42_1$ may suitably comprise the functional blocks of a detector $50_1$ and a radio test indicator $54_1$ connected to a processor $56_1$. The processor $56_1$ is also connected to the radio module $44_1$ and the memory $46_1$ in a conventional manner. The functions of the blocks in the microprocessor unit $42_1$, which may suitably include collecting and evaluating data concerning selected call processing activities for testing the operation of the radios in the base station $40_1$ in accordance with the inventive technique and indicating the results of these tests, are described in further detail below and may also be provided by a single shared processor. Such a processor may comprise a standard digital signal processor and would include read only memory for storing software and performing the operations discussed below. Other suitable embodiments may be readily implemented by those of ordinary skill in the art.

The detector $50_1$ may be any suitable device that detects, based on call processing activities occurring at the processor $56_1$, the transmission of message signals between the base station $40_1$ and a mobile station in the network 10. The detector $50_1$, for example, may suitably detect the presence of a wireless communication involving a radio in the base station $40_1$. The indicator $54_1$ may be any suitable device, such as a light emitting diode or audio alarm, which provides a visual or audible indication concerning the identification of a failure condition for a radio in the radio module $44_1$. Alternatively, the indicator $54_1$ may provide for the transmission of a message signal to a base station controller, not shown, in the network 10 which causes a suitable message to be displayed on a video display of a microprocessor unit which is used for monitoring wireless network operation. The processor $56_1$ may be any suitable microprocessor or microcontroller that interchanges data with the detector $50_1$, the indicator $54_1$, the memory $46_1$ and the radios $44_{1,1}$, $44_{1,2}$. . . $44_{1,x}$ in the radio module $44_1$ using conventional techniques. It is to be understood that the components included in the microprocessor unit $42_1$ may be similarly included in the ECP 22 and the other microprocessor units $42_{2,3\ldots x}$ or $62_{1,2,\ldots x}$.

Figure 2B:
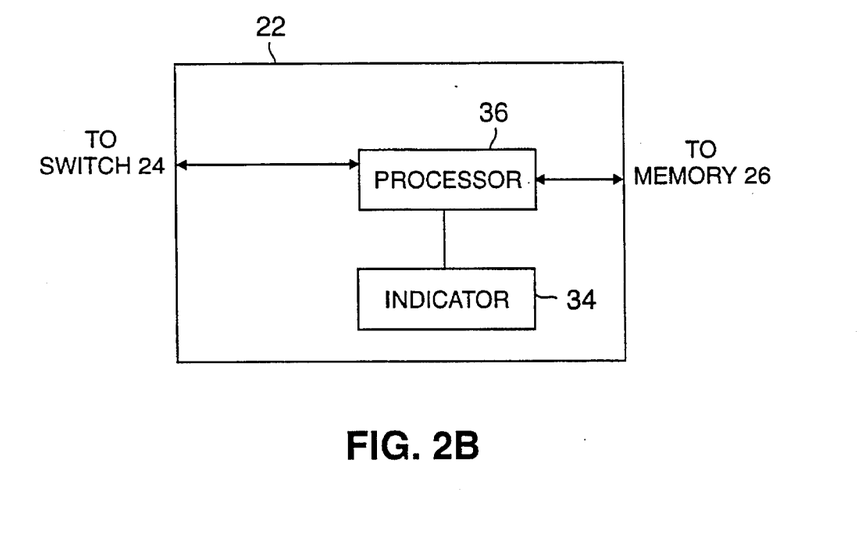
FIG. 2B illustrates an executive cellular processor unit including components for performing functions which implement the features of the present invention.

FIG. 2B shows a preferred embodiment of the ECP 22 in generalized block diagram form which includes components for performing the operations described below in accordance with the inventive technique. The ECP 22 suitably comprises a radio operation indicator 34 connected to a processor 36, which also is connected to the switch 24 and the memory 26. The indicator 34 is constructed and operates in a manner similar to the indicator $54_1$. The processor 36 may be any suitable microprocessor or microcontroller similar to that utilized for the processor $56_1$ above.

The cellular switch 24 in the MSC 20 operates in conjunction with the processor 36 for switching message signals, such as overhead and traffic message signals, between the ECP 22 of the MSC 20 and base stations in the network 10 or a publicly switched telephone network. According to a typical wireless network protocol, such as CDMA, the processor 36 processes message signals received from, or for transmission to, a base station in the network 10 or a publicly switched telephone network in order to establish a wireless communication linkage between a mobile station in the network 10 and a calling party or called party inside or outside the network 10.

Each radio in a radio module of a base station in the network 10 operates to receive or transmit specific information associated with a wireless communication to a mobile station. Typically, several radios in a radio module operate in conjunction with each other as a radio group for establishing and maintaining a wireless communication linkage. For example, a radio group may suitably include a first radio that operates over specific channels, called forward or downlink and reverse or uplink traffic channels, for transmitting and receiving voice signal information to and from a mobile station, respectively. Other radios may further be included in the group which operate over specific channels called overhead channels, such as pilot, access, paging and synchronization channels, for receiving and transmitting information associated with initially establishing and then maintaining a traffic channel communication linkage with a mobile station according to the protocol of the wireless network. Data received over overhead and traffic channels at the radios of a radio module are routed for processing to the processor within the respective base station according to conventional techniques.

The mobile radios $64_{1,2\ldots x}$ may suitably receive data transmitted on traffic and overhead channels from any of the radios in the radio modules $44_{1,2\ldots x}$ of the base stations $40_{1,2\ldots x}$. These data are then routed to the processors $62_{1,2\ldots x}$, respectively, for processing. The processors $62_{1,2\ldots x}$ also may suitably format data for transmission to a base station in the network 10. Further, the processors $42_{1,2\ldots x}$ and $62_{1,2\ldots x}$ store data concerning selected processing activities and other additional data in counters in the memories $42_{1,2\ldots x}$ and $66_{1,2\ldots x}$, respectively. The protocol of the network 10 or instructions provided to the processors $42_{1,2\ldots x}$ and $62_{1,2\ldots x}$ specifically determine what data are stored.

A wireless communication linkage between a caller in a publicly switched network and a mobile station in the network 10 is typically obtained as follows. The processor 36 of the ECP 22 transmits control message signals associated with establishing a communication or call to a mobile station via the switch 24 to a base station in the network 10. The base station that is utilized for establishing the communication linkage may be any one of the plurality of base stations $40_{1,2\ldots x}$ that includes radios which can establish and maintain a wireless communication linkage with the mobile station. For purposes of illustration, the operation of the network 10 is explained below for a wireless communication linkage between the mobile station $60_1$ and a radio in the base station $40_1$. It is to be understood that a similar communication linkage may be established between the mobile station $60_1$ or another mobile station and any other radio in a base station in the network 10. Further, it is to be understood that a wireless communication may also be initiated by a mobile station in a wireless network and the destination of the call may be another mobile station in the wireless network.

The control message signals transmitted from the ECP 22 and received at a radio in the base station $40_1$ are processed by the processor $56_1$. Based on the data contained in the control message signals, the processor $56_1$ provides formatted message signals to the radio module $44_1$ for selection of a radio for transmitting overhead channel data to the mobile station $60_1$. For purposes of illustration, the radio $44_{1,1}$ in the radio module $42_1$ is utilized for overhead channel transmission associated with establishing and maintaining a voice information communication linkage with the mobile station $60_1$.

If the linkage is established, another radio in the radio group including the radio $44_{1,1}$, such as, for purposes of illustration, the radio $44_{1,2}$, is utilized for voice signal information transmission to and from the mobile station $60_1$ over specific downlink and uplink traffic channels. It is to be understood that the communication with the mobile station $60_1$ may occur at any of a plurality of unique downlink and uplink channels upon which a radio in the radio module $44_1$ may operate.

As explained in Levy, V.C.M. and Qian, Nanjan, "Call control signalling for personal communications over interconnected metropolitan area networks," Proceedings of the 1994 Networks for Personal Communications, (March 1994) pp. 1–5, incorporated by reference herein, call processing activities associated with establishing and maintaining a wireless communication linkage and transmitting voice information signals between the base station $40_1$ and the mobile station $60_1$ are monitored by the processors $44_1$ and $64_1$ of the base station $40_1$ and the mobile station $60_1$, respectively. The call processing activities which are typically monitored include (i) those activities occurring on or associated with overhead channels, such as the establishment or severance of a voice connection by a base station or mobile station, and the identities of pilot signals detected by mobile stations; and, (ii) those activities concerning the transmission of information on traffic channels, such as the level of communication activity in a predetermined period of time, the duration of a completed wireless transmission, severance of a voice connection by a base station or mobile station and the percentage of voice information data transmitted in error per frame of voice data.

According to the present invention, data representative of selected call processing activities are collected at a base station and a mobile station in a wireless network during the course of a wireless communication to provide for testing of a radio in the base station without removing the radio from service. The collected data values are accessed and then processed to allow for comparison to expected values in order to identify a failure condition in a radio which is utilized for establishing, maintaining or effectuating a wireless communication linkage with a mobile station. A failure condition is defined as the detection of a malfunction in the operation of a radio. The present invention provides the advantage that the frequency for testing a radio in the network 10 is not limited by the stringent cost considerations associated with removing a radio from service for testing by a separate RTU. Further advantages include cost efficiencies gained by automation of radio testing procedures, and additional revenues which may be generated for a wireless communication service provider by testing of the radio while it remains in service.

Figure 3A:
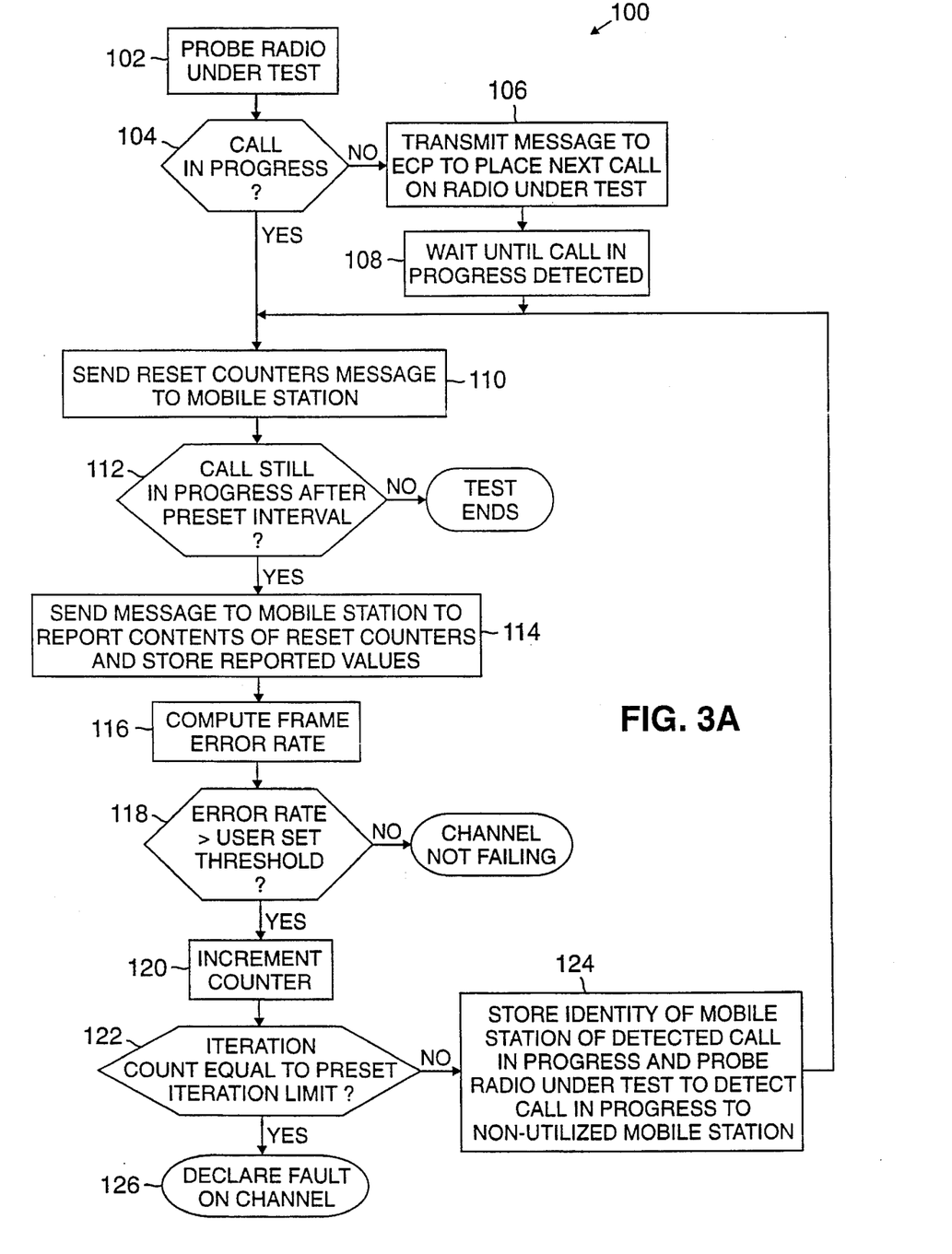
FIG. 3A is a flow diagram of a method for testing downlink traffic channel operation of a radio in a base station in the network of FIG. 1 according to the present invention.
Figure 3B:
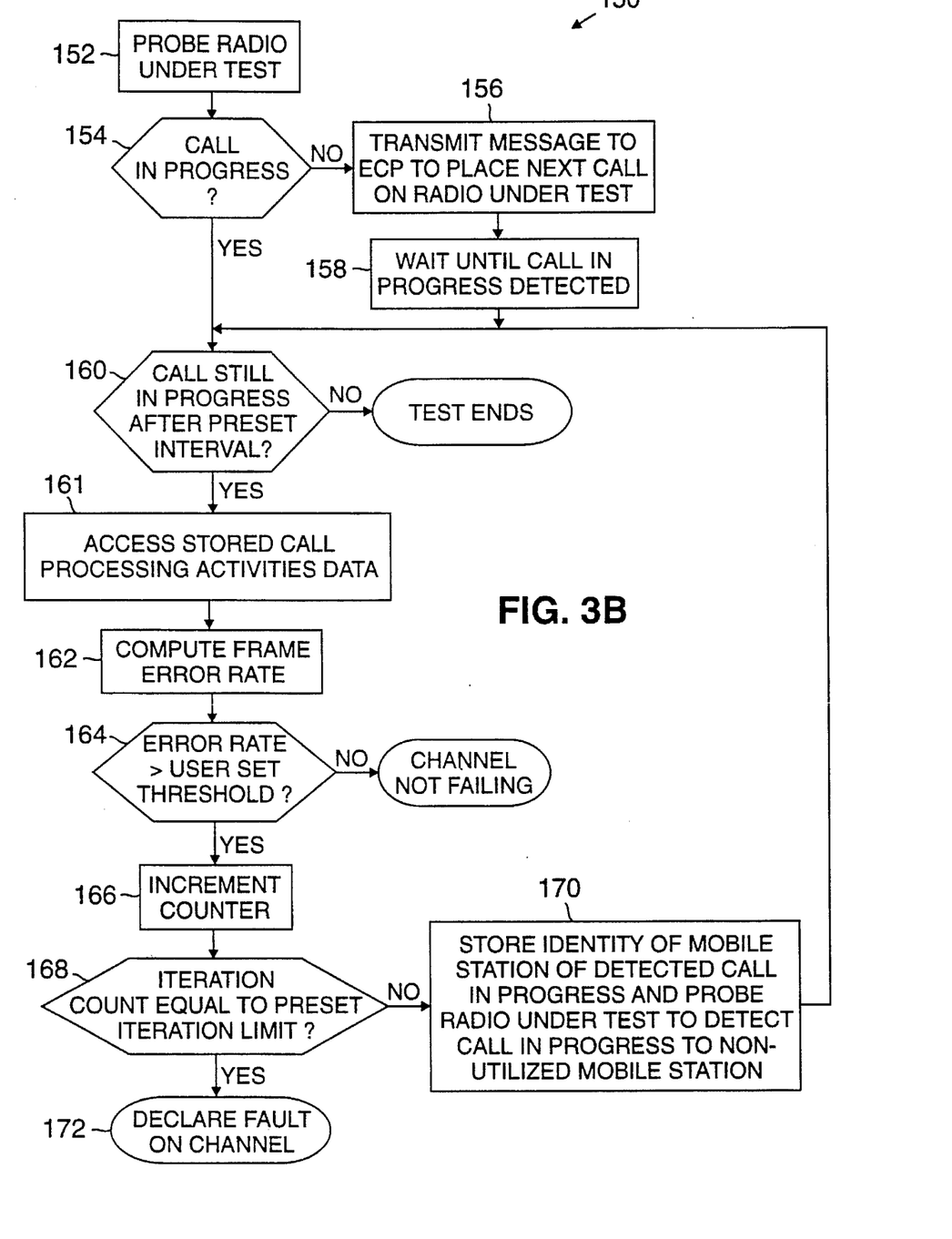
FIG. 3B is a flow diagram of a method for testing uplink traffic channel operation of a radio in a base station in the network of FIG. 1 according to the present invention.

In a first embodiment, methods for testing a radio in a base station which operates over traffic channels are described with reference to the flow diagrams shown in FIGS. 3A and 3B. FIG. 3A shows a process 100 for testing downlink traffic channel operation of a radio, and FIG. 3B shows a process 150 for testing uplink traffic channel operation of a radio. It is to be understood that the principles of this invention apply similarly for testing any radio in a base station which operates over traffic channels.

The processes 100 and 150 may be implemented as software algorithms which are downloaded to a memory of a base station and performed by the processor included therein. Alternatively, the algorithms associated with the processes 100 and 150 may be downloaded to the memory 26 located in the MSC 20 for performance by the processor 36. In another alternative embodiment, the algorithms may be accordingly downloaded to the memory of a base station and the memory 26 for performance, in part, by the processor of the base station and the processor 36. In still a further alternative embodiment, the algorithms may be downloaded to and executed by other network elements which may be included in the network 10. It is to be understood that other processes for implementing the inventive technique may be downloaded for execution in a similar manner. The details concerning the exchange of data between the MSC 20 and the base station $40_1$ which must occur for the processor 36 of the ECP 22 or other network elements to perform the steps of the processes 100 and 150, as described below, are well known and not a part of this invention.

A radio in a base station in the network 10 may suitably be identified for testing according to a predetermined, user defined testing schedule which is incorporated into the downloaded testing algorithm. For purposes of illustrating the processes 100 and 150, the radio $44_{1,1}$ in the base station $40_1$ operates over downlink and uplink traffic channels, and is indicated for testing by the processor $56_1$ according to the test schedule.

Referring to FIGS. 2A and 3A, in step 102, the detector $50_1$ probes the processor $56_1$ to determine whether a wireless call is in progress to a mobile station from the radio $44_{1,1}$, in other words, whether voice message signals are being transmitted between the former and latter. The detector $50_1$ obtains this information, according to well known techniques, by having the processor $56_1$ transmit a query to a suitable location in the memory $46_1$ that contains the desired information. If, in step 104, the detector $50_1$ determines from the query that a call is in progress from the radio $44_{1,1}$, step 110 is executed.

If a call is not in progress from the radio $44_{1,1}$, in step 106, the processor $56_1$ provides a formatted message signal to a suitable radio in the radio group including the radio $44_{1,1}$ for routing to the ECP 22. The message signal directs that the next wireless communication for a mobile station in the network 10 be established, if possible, using the radio $44_{1,1}$. Then, in step 108, the detector $50_1$ continuously probes the processor $56_1$ in a manner similar to that performed in step 102 until a call in progress is detected at the radio $44_{1,1}$. In an alternative embodiment, step 106 may be eliminated from the process 100 and step 108 may then be executed after step 104 if a call is not detected in progress in step 104. Step 110 is then executed following step 108.

For purposes of illustration, it is assumed that a call in progress has been detected between the radio $44_1$ and the mobile station $60_1$ during step 102. It is to be understood, however, that the call in progress detected in step 102 or 108 may involve any one of the mobile stations $60_{1,2\ldots x}$ in the network 10.

Continuing with the explanation of the process 100, in step 110, the processor $56_1$ directs a suitable radio in the radio group which includes the radio $44_{1,1}$ to transmit a reset counters message signal to the mobile station $60_1$. The reset message directs the microprocessor unit $62_1$ to reset counters in the memory $66_1$ which are used to store statistical data representative of selected call processing activities concerning the transmission of voice signal information over the forward traffic channel utilized by the radio $44_{1,1}$. For example, in accordance with the CDMA protocol, detailed statistical data concerning the presence of errors in the frames of voice signal information which are transmitted over a traffic channel are generated using the well known error detection test of cyclic redundancy checking (CRC) at a base station and mobile station, respectively, during the course of a wireless communication. Data values representative of the number of frames of transmitted voice signal information and the number of errors detected in each frame of data transmitted are stored in counters in the memories of a mobile station and a base station, respectively, as Mobile Retrievable Parameters (MRPs). Counters storing such parameters are reset in step 110 according to the inventive technique.

Likewise, it is typical in a wireless network that a mobile station periodically transmits to a base station in the course of a wireless communication signals indicating that a call involving traffic channel transmission is currently in progress to the mobile station. In a CDMA network, for example, the voice signals actually transmitted by the mobile station are utilized for detecting that a cellular telephone call is in progress. In step 112, the detector $50_1$ attempts to detect whether the call to the mobile station $60_1$ initially identified in either step 104 or step 108 has been continuously in progress since the transmission of the reset message signal in step 110 a predetermined, user defined time interval earlier. The time interval used for comparison in step 112 should suitably be set equal to a value that ensures that sufficient data for testing operation of the radio $44_{1,1}$ has been collected and stored in the memory $46_1$, and is preferably set equal to one minute. In a CDMA network, for example, data is typically transmitted at 20 msec/frame, such that a failure condition for the radio $44_{1,1}$ for downlink traffic channel operation may typically reliably be determined according to the present invention if 3000 frames of data are collected in a one minute time interval since the call was detected.

If, in step 112, the detector $50_1$ determines that the same call is not in progress, the test ends. Further downlink traffic channel testing of the radio $44_{1,1}$ may then suitably be performed by re-commencing testing automatically from step 102. Otherwise, if the same call is still in progress, step 114 is executed.

In step 114, the processor $56_1$ directs a suitable radio in the radio group which includes the radio $44_{1,1}$ to transmit a message signal to the mobile station $60_1$ which directs the microprocessor unit $62_1$ to (i) retrieve the data values concerning downlink traffic which are currently stored in the counters in the memory $66_1$, and then (ii) to format these data for transmission or reporting by the mobile radio $64_1$ to a radio in the radio group which includes the radio $44_{1,1}$ in order to allow for further processing by the processor $56_1$. Further in step 114, the processor $56_1$ stores any of these reported values in the memory $46_1$.

Then in step 116, the processor $56_1$ retrieves the stored data values concerning transmission on the downlink traffic channel of the radio $44_{1,1}$ and computes the frame error rate. In a CDMA network, for example, MRP values which represent the number of frames in error and the total number of frames transmitted during a particular time interval of the detected call in progress are the values which would have been transmitted to the base station $40_1$ to allow for calculation of the frame error rate.

In step 118, the processor $56_1$ compares the computed frame error rate value to a user defined, expected error rate value. The expected error rate should suitably be set equal to a value which, based on field experience and experimentation, indicates that the quality of a wireless communication for a radio, such as a voice signal or paging transmission, is acceptable. The expected value may suitably be set equal to a value that exceeds the typical frame error rate value of 1% and, presently, is preferably set equal to 5%. If the computed error rate value does not exceed the expected error rate value, a failure condition is not declared for downlink traffic channel operation of the radio $44_{1,1}$. Otherwise, step 120 is executed.

In step 120, the processor $56_1$ increments a location in the memory $46_1$ which is used for counting the number of iterations that the steps 110 through 118 of the process 100 are performed for testing the downlink traffic channel operation of the radio $44_{1,1}$. It is to be understood that a record of the number of iterations performed, or the iteration count, may be maintained using other well known means, such as including a separate counter in the base station $40_1$. The iteration count is maintained, according to the inventive technique, in order to improve the probability that a failure condition which is declared for the radio $44_{1,1}$ is not falsely indicated. For example, it is known that environmental interference or a faulty operating condition at a mobile station may cause errors in the transmission between a radio and a mobile station which can contribute to the determination of a high computed error rate value. As explained below, traffic channel operation of the radio $44_{1,1}$ is tested for several iterations with different mobile stations to minimize the probability that a failure condition is incorrectly declared. Step 122 is executed after step 120.

In step 122, the processor $56_1$ determines whether the value of the iteration count stored in the memory $46_1$ is equal to a preset, user defined iteration limit, which is preferably equal to three. If the iteration count is equal to the iteration limit, the processor $56_1$ proceeds to perform step 126. Otherwise, step 124 is executed.

In step 124, the processor $56_1$ stores in the memory $46_1$ data indicating the identity of the mobile station involved in the most recent iteration of the process 100, in other words, the mobile station which currently reported the data values in step 114. Further in step 124, the detector $50_1$ probes the processor $56_1$, in a manner similar to that performed in step 102, until a call in progress is detected from the radio $44_{1,1}$ to a mobile station different than that previously used for obtaining data for testing the downlink traffic channel operation of the radio $44_{1,1}$. Hereinafter, a mobile station not previously used for obtaining call processing activity data during testing of traffic channel operation of a radio at interest is called a non-utilized mobile station. Non-utilized mobile stations are suitably selected in step 124 from available mobile stations.

Once the detector $50_1$ in step 124 detects that a call is in progress from the radio $44_{1,1}$ to a non-utilized mobile station, steps 110 through 118 of the process 100 are performed using that mobile station in the same manner as explained above. After steps 110 through 118 are performed for a second iteration, if in step 118 the processor $56_1$ determines that a failure condition is once again indicated for the downlink traffic channel operation of the radio $44_{1,1}$, additional iterations of steps 110 through 118 are performed until the calculations using the data values obtained indicate that a failure condition is not present on the downlink traffic channel of the radio $44_{1,1}$ or the iteration limit is reached, whichever occurs first.

Assuming that the iteration limit is reached in step 126, the indicator $54_1$ provides an indication that a failure condition is present at the radio $44_{1,1}$ for operation on the downlink traffic channel. This indication may be transmitted to the MSC 20 in a well known manner to provide a message signal to the system operator that maintenance procedures should be performed on the radio $44_{1,1}$ to correct the failure condition. Typical maintenance procedures may include a technician removing a radio from a base station and replacing the radio, or re-programming the system software for altering the system operations of the base station so that the failed radio is no longer used for purposes of receiving or transmitting communication signals.

FIG. 3B shows the process 150 for testing operation of the uplink traffic channel of the radio $44_{1,1}$. In steps 152, 154, 156 and 158 of the process 150, the detector $50_1$ probes the processor $56_1$ in a manner which is similar, and preferably identical, to that described above for the steps 102, 104, 106 and 108 of the process 100, respectively, until a call in progress is detected between the radio $44_{1,1}$ and a mobile station in the network 10. After a call in progress to the radio $44_{1,1}$ is detected in step 154 or step 158, step 160 is executed. For purposes of illustration, it is assumed that a call in progress to the mobile station $60_1$ has been detected in step 154.

In step 160, after a predetermined, user defined time interval has passed since the detection of the call, the detector $50_1$ probes the processor $56_1$ to determine whether the call in progress identified in either step 154 or step 158 is continuing. As in step 112 of the process 100, the time interval is suitably set to a value that ensures that sufficient data are collected and stored for reliably determinating the operating condition of a radio under test. If the call has not continued for the defined interval, the test ends. Otherwise, step 161 is then executed.

In step 161, the processor $56_1$ retrieves the data values stored in the memory $46_1$ according to the typical wireless network protocol. These data values concerns the detected call in progress and, in particular, the number of frames which were detected in error for the voice information frames transmitted from the mobile station $60_1$ to the base station $40_1$ over the uplink traffic channel of the radio $44_{1,1}$. In step 162, the processor $56_1$ utilizes these data values to compute the frame error rate for transmission on the uplink traffic channel of the radio $44_{1,1}$. This calculation is performed in a manner similar to that in step 116 above.

In step 164, the processor $56_1$ compares the computed frame error rate value to an expected frame error rate value in the same manner as in step 116 of the process 100. Testing ends if the comparison indicates that the uplink traffic of the radio $44_{1,1}$ channel is not failing. Otherwise, steps 166 through 172 are executed for determining whether further iterations of testing the uplink traffic channel of the radio $44_{1,1}$, using one or more non-utilized mobile stations, should be performed. The steps 166 through 172 are similar, and preferably identical, to the steps 120 through 126 of the process 100, respectively. In the process 150, however, the processor $56_1$ proceeds to perform step 160 after the detector $50_1$ detects a call in progress to a non-utilized mobile station in step 170.

In another embodiment of the invention, overhead channel operation of a radio is tested by collecting, during wireless communications and without removing the radio under test from service, data concerning selected call processing activities at a base station including the radio under test.

Figure 4:
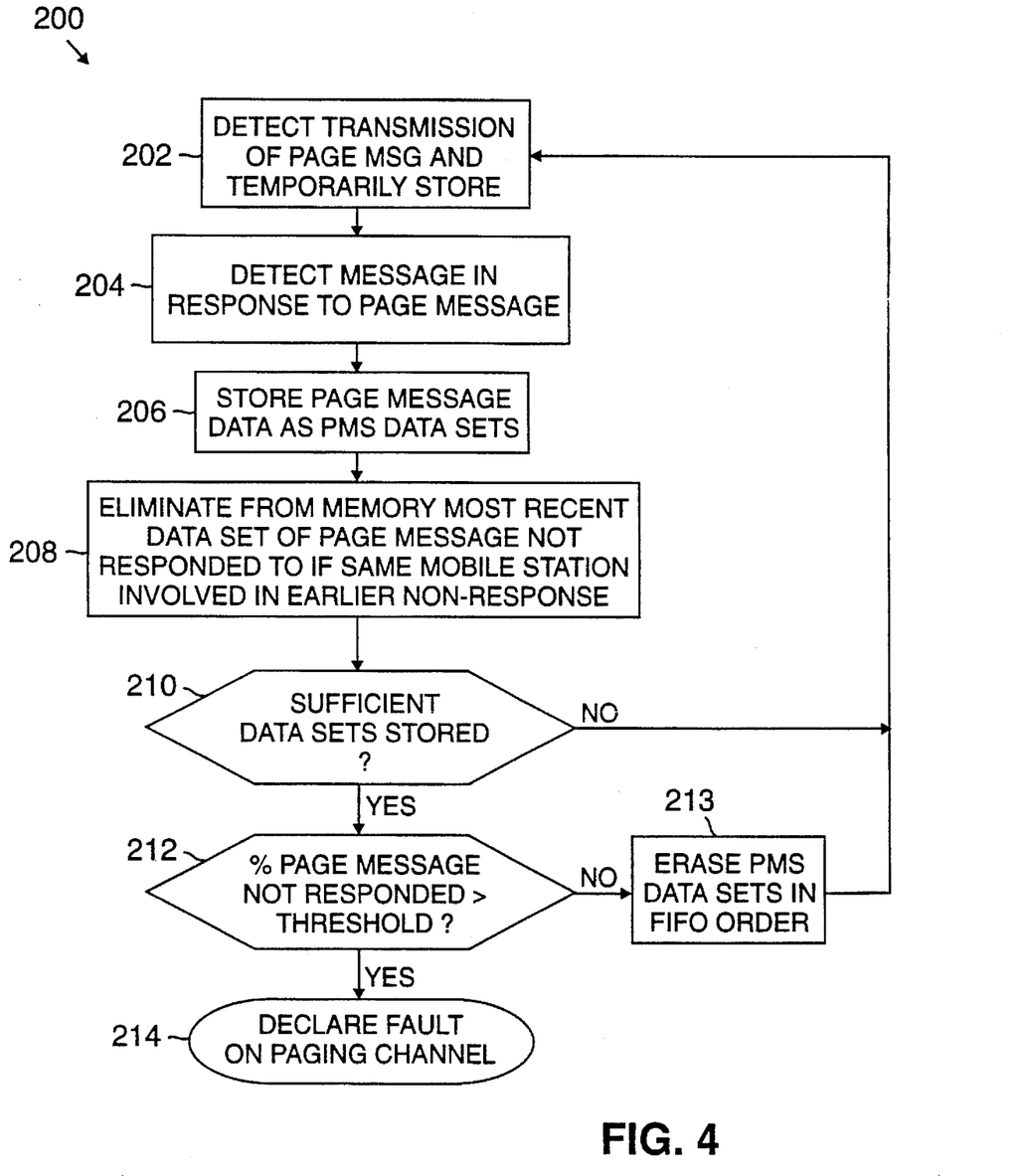
FIG. 4 is a flow diagram of a method for testing paging overhead channel operation of a radio in a base station in the network of FIG. 1 according to the present invention.

FIG. 4 shows a process 200 for testing the operation of an overhead channel, known as a paging channel, of a radio in a base station of a wireless network when such testing is indicated by a predetermined, user defined test schedule. In a typical wireless network, such as a CDMA network, a paging message is transmitted by a radio on an overhead paging channel in response to an attempt by a mobile station to place a wireless call to the base station, or in response to a message signal transmitted from a mobile station indicating that the mobile station is prepared to accept a call that a radio in the radio group including the radio under test is attempting to place to that mobile station. The inventive technique takes advantage of the typical wireless network protocol requirement that a mobile station in the network respond to specific paging messages it receives base station, such that some of these page message signals may be used for testing whether a high probability for response exists. As more fully discussed below, selected paging message signals that a base station transmits in response to a mobile station are utilized for determining that a mobile station is in the vicinity of a base station.

For purposes of illustrating the process 200, it is assumed that paging channel transmission occurs on the radio $44_{1,2}$ in the base station $40_1$. It is to be understood that the inventive technique may be implemented for testing paging channel operation of other radios in base stations in the network 10.

In step 202, the detector $50_1$ monitors the radio $44_{1,2}$ to detect the transmission of a paging message signal. The processor $56_1$ stores in a temporary location of the memory $46_1$ data representative of the time that a particular page message signal transmission is detected and the mobile station which is the destination of that paging message signal. In step 204, the detector $50_1$ attempts to detect whether the destination mobile station transmits, within a defined interval from the time the page message signal transmission was detected, a message signal responsive to the page message signal. Ordinarily, a destination mobile station that is functioning properly would transmit, within an interval defined by the protocol of the wireless network, a message responsive to a paging message signal to a suitable radio in the base station that transmitted the paging message signal.

In step 206, the processor $56_1$ creates a page message signal (PMS) data set for storing information in the memory $46_1$ concerning a detected page message signal transmission and a response thereto by the destination mobile station. The PMS data set suitably includes representative data which identifies the time of detection of a paging message signal, the destination mobile station associated with the paging message signal transmission, whether a responsive message was transmitted by the destination mobile station and the time that any such response was detected. PMS data sets are continuously collected in step 202 as part of testing the paging channel operation of a radio, and each PMS data set is stored in the memory $46_1$ according to the time of detection. As explained below with reference to step 210, a total of B PMS data sets are suitably stored in the memory $46_1$, where B is preferably equal to one hundred, before processing of the stored data according to the inventive technique occurs.

In step 208, the processor $56_1$ eliminates the most recently collected PMS data set from the memory $46_1$ if the destination mobile station for that PMS data set did not respond to the respective paging message signal within the defined time interval, and a PMS data set stored in the memory $46_1$ indicates that the identical mobile station did not respond to a previous page message signal. The PMS data set is eliminated from the memory $46_1$ because it is inferred that the particular destination mobile station of interest is not functioning properly. Of course, the first time that step 202 is performed, no action can occur in step 208. Step 210 is executed after step 208.

In step 210, the processor $56_1$ determines from the memory $46_1$ whether B PMS data sets have been stored in the memory $46_1$. If B PMS data sets have been stored, step 212 is performed, otherwise, data collection continues in step 202.

In step 212, the processor $56_1$ determines from the PMS data sets stored in the memory $46_1$ whether the proportion of paging messages not responded to exceeds a user defined, expected threshold value. Based on field experience, it is typically expected that mobile stations would respond to more than 99% of the transmitted page message signals on a timely basis. Preferably, the threshold for comparison is set equal to 5%. A failure is declared for paging channel operation of the radio $41_{1,2}$ if the calculated value exceeds the threshold. In this case, the system operator would be notified that a repair is required. Otherwise, in step 213, an individual PMS data set is erased by the processor $56_1$ from the memory $46_1$ in first-in-first-out order according to conventional techniques, in other words, the PMS data set stored in the memory $46_1$ which was detected earliest in time is erased from the memory $46_1$. Data collection and testing for a paging channel failure then continues in step 202 according to the test schedule.

In a further aspect of the invention, data representative of selected call processing activities may be collected during the course of a wireless communication for testing overhead channel operation of a plurality of radios in a wireless network by a processor external to the base stations which include the radios under test, without requiring the removal of any of these radios from service. By way of example, a process 300, shown in FIG. 5, for simultaneously testing all radios in the base stations of the network 10 which utilize overhead channels, called pilot signal channels, for establishing a wireless communication linkage is described below.

Figure 5:
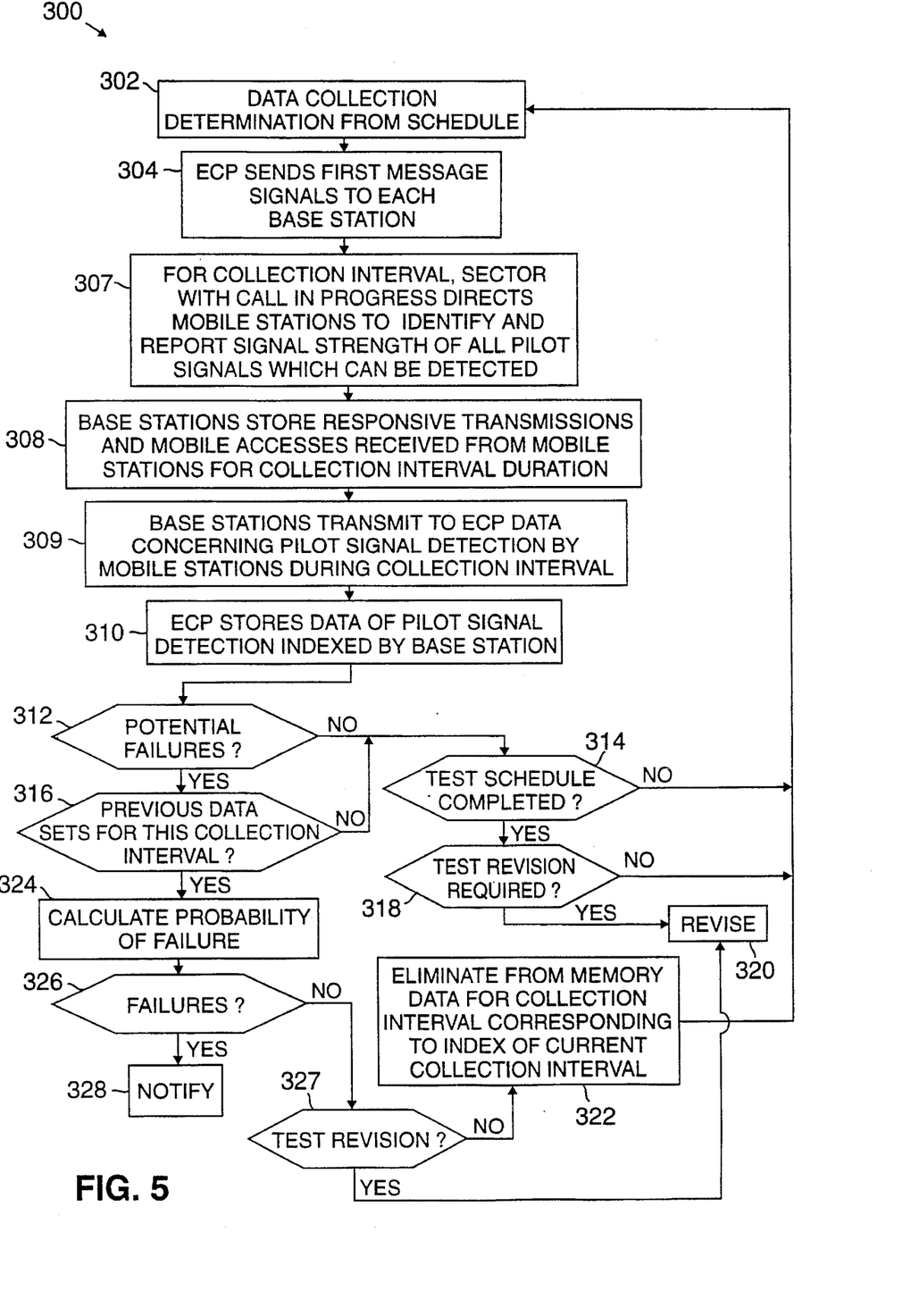
FIG. 5 is a flow diagram of a method for testing pilot overhead channel operation of a radio in a base station in the network of FIG. 1 according to the present invention.

For purposes of illustration, the ECP 22 is preferably utilized for performing the process 300. It is to be understood, however, that the process 300 may be performed by other suitably operable network elements which may be included in the network 10.

At this point, pilot signal operation according to a typical wireless network protocol, such as CDMA, is explained to provide a background for understanding the process 300. Each base station has a geographic communication radius comprising one or more sectors. Each sector includes a radio called a pilot signal radio which continuously transmits a unique pilot signal over an overhead channel. A mobile station in the network, when activated, typically collects data representative of any pilot signal radio transmission which can be detected. The internal processing and memory capabilities of a mobile station control the number of pilot signals that a mobile station can detect and store. Each sector also suitably includes a radio for receiving a message signal, called a mobile access, on an overhead channel and a radio for transmitting and receiving traffic channel information. A mobile access is a message signal which, according to a typical wireless network protocol such as CDMA, a mobile station transmits on an overhead channel to a base station when the mobile station is within range and is communicating with a base station for any one of a number of reasons. In accordance with the present invention, the reception of a mobile access on a sector indicates that the pilot signal radio of the sector is functioning.

Referring to FIG. 5, in step 302, the processor 36 determines whether data collection is indicated according to a pilot signal test schedule. The pilot signal test schedule establishes times for collection of data concerning call processing activities that includes the detection of pilot signals at the mobile stations $60_{1,2\ldots x}$ and the reception of mobile accesses at radios in the base stations $40_{1,2\ldots x}$. The test schedule suitably indicates the times of day for the collection of data, and preferably provides for the collection of a set of data concerning selected call processing activities over a specified collection period, such as a one week period; at specific collection intervals, aa, over the collection period, such as every other hour each day of the collection period; and, at specific collection times during a collection interval, such as at each minute of an hour of a one hour collection interval. The number of collection intervals, aa, in a collection period may range from 1 to AA, where AA is a user defined value. The number of collection times per collection interval is defined as a collection frequency zz. As explained below, the collection frequency and the collection intervals of a test schedule may influence the reliability of calculations performed according to the present inventive technique for testing pilot signal radio operation, and may be changed as required. The pilot signal test schedule may be suitably downloaded to the memory 26 of the ECP 22 using conventional techniques to allow for easy modification of the schedule if such modification is indicated. When in step 302 the processor 36 determines that the test schedule indicates that data should be collected for a collection interval, step 304 is executed.

In step 304, the processor 36 transmits first message signals to each of the processors $56_{1,2\ldots x}$ of the base stations $40_{1,2\ldots x}$ in the network 10 via the switch 24 and the transmission facilities $30_{1,2,...x}$, respectively. These first message signals contain instructions directing the microprocessor units $42_{1,2...x}$ in each of the base stations $40_{1,2...x}$ to provide for the collection of data concerning pilot signal detection at the mobile stations $60_{1,2...x}$ for the duration of the current collection interval, and then to transmit these data to the MSC 20 as explained in step 309 below.

In step 307, a radio in a sector of a base station in the network 10 which includes a radio currently engaging in a wireless communication with a mobile station, known as a mobile station on the sector of the pilot signal radio, transmits a second message signal to that mobile station at each collection time of the collection interval. The second message signal contains instructions that direct a mobile station (i) to collect data which identifies the source of all pilot signals that can be detected, and then (ii) to transmit a third message signal containing these collected data to a suitable radio in the sector of the base station that transmitted the second message signal to the mobile station. The third message signal may suitably be transmitted on a data sub-channel of the uplink traffic channel of a radio included in the sector which includes the pilot signal radio of interest.

In step 308, a detector in each base station at all times monitors the mobile access overhead channel activities of radios in the respective base station to detect the transmission of mobile accesses to radios in the sectors of the respective base station. The processors $56_{1,2...x}$ collect, and store in the memories $46_{1,2...x}$, data representative of mobile accesses detected according to the time that a mobile access was detected and the sector of the base station that received the mobile access. Further, a detector in each base station in the network 10 that transmitted a second message signal detects whether a third message signal, which is associated with a second message signal transmission at a particular collection time of the collection interval, was transmitted to a sector in the respective base station. For each detected third message signal transmission for the collection interval, the processor in the base station stores in its memory the data included in the third message signal. In this manner, data concerning the call processing activity of the detection pilot signal radio transmissions by mobile stations are collected in steps 307 and 308 in accordance with the present invention for testing pilot signal radios without removing the pilot signal radios in the network 10 from service. Step 309 is then executed.

In step 309, the processor of each base station formats for transmission and then transmits to the MSC 20 a fourth message signal including the data collected and stored at the base station during the collection interval. The fourth message signal suitably consists of the following data records concerning each third message signal transmission during the collection interval: the identity of a mobile station, $MIN_i$, that transmitted a third message signal to a sector, $SEC_i$, including the pilot signal radio $PLT_i$ of the sector $SEC_i$; and the sector of a base station where a mobile station was located when the pilot signal radio transmission was detected. Further, the fourth message signal data records also include the data collected concerning detected mobile accesses in step 308. For purposes of illustration, the network 10 includes sectors, where NUM is suitably equal to at least six, and preferably greater than 6. The fourth message signal may be transmitted to the MSC 20 after data is collected for each collection time. Alternatively, data may be collected for an entire collection interval, and then transmitted in its entirety as a fourth message signal at the end of the collection interval.

In step 310, the processor 36 stores in the memory 26 data representative of the data records transmitted in the fourth message signals indexed according to the sector of the base station of origin. Preferably, the data concerning pilot signal detection that an on-sector mobile station collects during a specific collection interval are stored in the memory 26 as data strings which are indexed by the collection interval, aa. These data strings may suitably include fields which identify the detected pilot signal radios, $PLT_a$, $PLT_b$, ... $PLT_z$, the on sector mobile station $MIN_i$ which detected the pilot signal radios and the sector, $SEC_i$, where the mobile station $MIN_i$ was located at the time of detection of pilot signal radio transmissions. A suitable data string including these fields may be expressed as follows: aa: $MIN_i$, $SEC_i$: $PLT_a$, $PLT_b$, ... $PLT_z$. Step 312 of the process 300 is then executed.

In step 312, the processor 36 evaluates the data collected during the current collection interval in order to identify a potential pilot signal radio failure. A potential pilot signal radio failure is declared if all of the following criteria are satisfied: (1) the pilot signal radio did not have any mobile stations on any traffic channel of its sectors during the collection interval; (2) a radio in the sector did not receive a mobile access; and, (3) the pilot signal radio was not detected by any mobile station during the collection interval. If a potential failure is not indicated, the processor 36 proceeds to perform step 314. Otherwise, step 316 is executed.

In step 314, the processor 36 examines the test schedule to determine if data for AA collection intervals, or a reference data set, has been stored in the memory 26. If data for AA collection intervals have not been stored, step 302 is executed and data collection proceeds according to the test schedule. Otherwise, step 318 is executed.

In step 318, the processor 36 evaluates the data in the reference data set to determine whether revision of the test schedule is required. A test schedule may be indicated for revision if the processor 36 determines from the reference data set that the data collected and stored during the AA collection intervals are not sufficient, according to a user defined value, to ensure a highly reliable determination of whether a pilot signal radio is failing according to the present invention. Insufficient data collection may occur, for example, because too few mobile stations in a network may be engaging in a wireless communication with radios of base stations during some of the indicated collection intervals of the pilot test schedule. In addition, test schedule revision is appropriate if a pilot signal radio was identified as operating properly only based on the detection of a mobile access, which, by itself, does not provide a highly reliable indication of pilot signal radio operation. A revision may also be indicated if a potential failure was not identified as actually failing, as explained below.

If test revision is required, in step 320, the indicator 34 provides such indication to the system operator. The revisions implemented may include modifying the schedule as to the times and the days of the week that collection of data occurs in order to provide for more data to be collected from a larger number of wireless communications occurring during data collection times. Otherwise, data collection proceeds from step 302.

For the case where a potential failure is declared in step 312, then in step 316, the processor 36 determines whether the memory 26 includes data collected during a collection interval, called a past collection interval, that corresponds in time to the current collection interval. For example, data collected for a past collection interval which, for example, starts on Monday at 1 a.m. for the previous one week collection period, corresponds in time to data collected for the current collection interval which starts on Monday at 1 a.m. during the current week. If the reference set does not include data for the corresponding past collection interval, step 314 is executed. Otherwise, step 324 is executed.

In step 324, the processor 36 determines, based on the data collected for the corresponding past collection interval, the probability that a mobile station would have been present in a location that would have allowed for detection of a pilot signal transmission from a pilot signal radio which was declared potentially failing in step 312 for the current collection interval. In accordance with present inventive technique, such a probability is suitably estimated based on data collected concerning the detection of pilot signal transmissions from other pilot signal radios, respectively, during the corresponding past collection interval.

In a preferred embodiment, the processor 36 suitably correlates the data stored in data strings for the past collection interval into composite data strings, which represent the unique combinations of mobile stations and pilot signal radios detected over that collection interval. For example, if the collected data indicated that a mobile station, $MIN_i$, on the sector $SEC_i$, detected only a pilot signal radio $PLT_i$ for the collection times in the first half of the collection interval, and only a pilot signal radio $PLT_j$ for collection times in the second half of the collection interval, the composite data string for this collection interval is suitably expressed as: $aa:MIN_i$, $SEC_j$: $PLT_{comp}$, where $PLT_{comp}$ includes $PLT_i$ and $PLT_j$.

By way of example, in step 324, the processor 36 determines whether a potentially failing pilot signal radio, $PLT_j$, is actually failing by computing the probability that a mobile station, which was on $SEC_i$ at the some time during the past collection interval, would have detected the potentially failing pilot signal radio, $PLT_j$. This probability is suitably computed from the equation:

$$P\{(SEC_i, aa), PLT_j\} = N(i|j)aa/N(i)aa, \quad [1]$$

where $N(i|j)aa$ is equal to the number of mobile stations that reported to $SEC_i$ the detection of pilot signal radio transmissions at some time during the past collection interval which included the detection of a transmission from the pilot signal radio $PLT_j$, and where $N(i)aa$ is equal to the number of mobile stations which reported to the sector $SEC_i$ the detection of pilot signal radio transmissions during the past collection interval. $N(i)aa$ may preferably be determined from the number of composite strings stored in the memory 26 having different $MIN_i$, and $N(i|j)aa$ may preferably be determined from the number of composite strings having different $MIN_i$ and both $SEC_i$ and $PLT_j$.

In addition, in step 324, the processor 36 may suitably compute the probability that a mobile station which crossed the geographic area covered by the sectors $SEC_i$, $SEC_j$, and $SEC_k$ which are in proximity to each other, and preferably in a straight line should have detected the potentially failing pilot signal radio $PLT_j$ during the current collection interval. The expected probability is that such a mobile station will detect all the pilot signals for the sectors $SEC_i$, $SEC_j$ and $SEC_k$, respectively. The probability that the potentially failing pilot signal radio $PLT_j$ is detected by such a mobile station is computed from the equation:

$$P\{(SEC_i, SEC_j, aa), PLT_k\} = N(i,j|k)aa/N(i,j)aa, \quad [2]$$

where $N(i,j|k)aa$ is defined as the number of mobile stations that during the past collection interval reported to both $SEC_i$ and $SEC_j$ and also reported the detection of $PLT_k$, and where $N(i,j)aa$ is defined as the number of different mobiles that reported pilot signal radio detection on both $SEC_i$ and $SEC_j$ during the past collection interval. $N(i,j)aa$ may preferably be determined from the number of strings with different $MIN_i$ and both $SEC_i$ and $SEC_j$.

The values computed using equation [1] and [2] represent the proportions of mobile stations that meet the respective probability criteria. In an alternative embodiment, these values may be adjusted so that each probability value is lower than the expected value of the actual probability. The values may be adjusted, for example, by adding 1 to the denominator of equations [1] and [2] in order to avoid the case that the probability of detecting a pilot signal radio transmission is 100%. Using the adjusted values from equations [1] and [2], the probability that the potentially failing pilot signal radio $PLT_j$ should have been detected during the current collection interval may be suitably calculated as follows:

$$1 - \prod_i (1 - P(SEC_i, aa) PLT_k)^{N(i|k)aa} \cdot \prod_{i,j} (1 - P(SEC_i, SEC_j, aa) PLT_k)^{N(i,j|k)aa} \quad [3]$$

In step 326, based on the results of the computation performed in step 320, the processor 36 determines if any potentially failing pilot signal radio is indeed failing. By way of example, the processor 36 compares the value obtained for equation [3] with an expected threshold value, which is typically set equal to 99%. If the computed probability for detection of any potentially failed pilot signal is greater than the threshold, step 328 is executed. In step 328, as at least one pilot signal radio failure exists, the indicator 34 in step 328 provides an alert to the systems operator. Otherwise, test revision is performed in step 327 which is similar, and preferably identical, to step 318. If test revision is required, step 320 is executed. Otherwise, step 322 is executed. In step 322, the processor 36 erases the data stored in the reference set in the memory 26 for the past collection interval which corresponds, in time, to the current collection interval. Data collection then proceeds from step 302.

It is to be understood that the embodiments and variations shown and described above are illustrative of the principles of this invention only and that various modifications may be implemented by those skilled in the art without departing from the scope and spirit of the invention.

I claim:

1. A method for testing a radio in a base station of a wireless communication network comprising the steps of:

detecting a wireless communication in progress between the radio and a mobile station in the network;

collecting data concerning call processing activities associated with detecting frames in error on a traffic channel of the radio during the course of the wireless communication between the radio and the mobile station;

computing a frame error rate value from the collected data values;

setting an expected frame error rate value;

comparing the computed frame error rate value to the expected frame error rate value for purposes of determining whether the radio is operating properly; and, providing an indication that the radio is failing.

2. The method of claim 1, wherein the step of collecting data is performed at the mobile station in the network.

3. The method of claim 1, wherein the step of collecting data is performed at the base station.

4. The method of claim 1, wherein the step of collecting data is performed at the base station and the mobile station.

5. An apparatus for testing a radio in a base station of a wireless communication network, wherein the network comprises a plurality of mobile stations, the apparatus comprising:

a detector for detecting a wireless communication in progress between the radio and the mobile station in the network, a memory for storing data concerning call processing activities associated with frames detected in error on a traffic channel of the radio which are collected during the course of a wireless communication between the radio and the mobile station, and for storing an expected frame error rate value;

a processor for computing a frame error rate value from the collected data values and for comparing the computed frame error rate value to the expected frame error rate value in order to determine whether the radio is operating properly; and, an indicator for indicating that the radio is failing.

6. The apparatus of claim 5, wherein the indicator is an audible alarm means which provides an audible signal when the radio is determined to be failing.

7. The apparatus of claim 5, wherein the indicator is a visual display means which provides an audible signal when the radio is deemed failing.

8. The apparatus of claim 5, wherein the apparatus is included in the base station of the radio under test.

9. The apparatus of claim 5, wherein the apparatus is included in a base station in the network that does not contain the radio under test.

10. The apparatus of claim 5, wherein the apparatus is included in a mobile switching center of the network.

11. The apparatus of claim 5, wherein the data concerning call processing activities are collected at the mobile station in the network.

12. The apparatus of claim 5, wherein the data concerning call processing activities are collected at the base station.

13. The apparatus of claim 5, wherein the data concerning call processing activities are collected at the mobile station and the base station.

14. A method for testing a radio in a base station of a wireless communication network comprising the steps of:

detecting a wireless communication in progress between the radio and a mobile station in the network;

collecting data concerning selected call processing activities during the course of the wireless communication between the radio and the mobile station;

processing the collected data values; and, comparing the processed data values to expected values for purposes of determining whether the radio is operating properly.

15. The method of claim 14, wherein the step of collecting data is performed at the mobile station in the network.

16. The method of claim 14, wherein the step of collecting data is performed at the base station.

17. The method of claim 14, wherein the step of collecting data is performed at the base station and the mobile station.

18. The method of claim 14, wherein the radio operates over traffic channels.

19. The method of claim 18, wherein the call processing activities data are collected for testing the operation of an uplink channel operation of the radio.

20. The method of claim 18, wherein the call processing activities data are collected for testing the operation of a downlink channel of the radio.

21. The method of claim 14, wherein the radio operates over overhead channels.

22. The method of claim 21, wherein the call processing activities data are collected for testing the operation of a pilot signal channel of the radio.

23. The method of claim 14, further comprising the step:

providing an indication whether the radio is operating properly.

24. An apparatus for testing a radio in a base station of a wireless communication network, wherein the network comprises a plurality of mobile stations, the apparatus comprising:

a detector for detecting a wireless communication in progress between the radio and the mobile station in the network, a memory for storing data concerning selected call processing activities which are collected during the course of a wireless communication between the radio and the mobile station;

a processor for processing the collected data values stored in the memory and comparing the processed data to expected values in order to determine whether the radio is operating properly; and, an indicator for indicating the operating condition of the radio.

25. The apparatus of claim 24, wherein the apparatus is included in the base station of the radio under test.

26. The apparatus of claim 24, wherein the apparatus is included in a base station in the network that does not contain the radio under test.

27. The apparatus of claim 24, wherein the apparatus is included in a mobile switching center of the network.

28. The apparatus of claim 24, wherein the data concerning call processing activities are collected at the mobile station in the network.

29. The apparatus of claim 24, wherein the data concerning call processing activities are collected at the base station.

30. The apparatus of claim 24, wherein the data concerning call processing activities are collected at the mobile station and the base station.

31. The apparatus of claim 24, wherein the processor collects data concerning call processing activities for testing traffic channel operation of the radio.

32. The apparatus of claim 31, wherein the traffic channel tested is an uplink channel.

33. The apparatus of claim 31, wherein the traffic channel tested is a downlink channel.

34. The apparatus of claim 24, wherein the processor collects data concerning call processing activities for testing overhead channel operation of the radio.

35. The apparatus of claim 34, wherein the overhead channel tested is a pilot channel.

36. A method for testing downlink traffic channel operation of a radio in a base station of a wireless communication network, comprising the steps of:

(A) detecting a wireless communication in progress between the radio and a mobile station in the network;

(B) transmitting a first message signal from the base station to the mobile station during the course of the detected wireless communication directing the mobile station to collect selected data concerning call processing activities associated with downlink transmission from the radio;

(C) transmitting a second message signal from the base station to the mobile station directing the mobile station to transmit to the base station a third message signal containing data representative of the collected call processing activities data, if the detected wireless communication is still in progress a preset interval after detection;

(D) computing a frame error rate for transmission on the downlink channel using the call processing activities data included in the third message signal;

(E) performing steps (A), (B), (C) and (D) for a predetermined number of iterations for testing the downlink traffic channel operation of the radio using a non-utilized mobile station of the network for each iteration, if the computation performed in step (D) for the first time that step (D) is performed and each subsequent time that step (D) is performed results in the computation of an error rate value which exceeds a threshold error rate value; and, (F) indicating a failure condition on the downlink traffic channel if the predetermined number of iterations have been performed and the final computation of an error rate value for the downlink traffic channel transmission number exceeds the threshold error rate value.

37. The method of claim 36, wherein the step (A) further comprises the step of transmitting a fourth message to a mobile switching center of the network directing that a wireless communication be completed using the radio.

38. An apparatus for testing downlink traffic channel operation of a radio in a base station of a wireless communication network, comprising:

a detector for detecting a wireless communication in progress between the radio and a mobile station in the network;

a memory for storing data concerning selected call processing activities associated with wireless communications which may be collected at the mobile station during the course of a wireless communication between the radio and the mobile station;

a processor for computing a frame error rate for transmission on the downlink channel of the radio using the call processing activities data stored in the memory, wherein the processor directs the detector to detect a wireless communication over the downlink traffic channel to a non-utilized mobile station in the network for a predetermined number of iterations if the first time that the computation is performed and each subsequent time that the computation is performed results in the computation of an error rate value which exceeds a threshold error rate value; and, an indicator for indicating that downlink traffic channel operation of the radio is not properly functioning if the predetermined number of iterations have been performed and the final computed error rate value exceeds the threshold error rate value.

39. A method for testing uplink traffic channel operation of a radio in a base station of a wireless communication network, comprising the steps of:

(A) detecting a wireless communication in progress between the radio and a mobile station in the network;

(B) retrieving call processing activities data stored at the base station concerning transmission on the uplink traffic channel of the radio, if the detected wireless communication is still in progress after a preset interval since detection in step (A);

(C) computing a frame error rate for transmission on the uplink channel using the call processing activities data retrieved in step (B);

(D) performing steps (A), (B), and (C) for a predetermined number of iterations for testing the uplink traffic channel operation of the radio using a non-utilized mobile station of the network for each iteration, if the computation performed in step (C) for the first time that step (C) is performed and for each subsequent time that step (C) is performed results in the computation of an error rate value which exceeds a threshold error rate value; and, (E) indicating that a failure condition exists on the uplink traffic channel if the predetermined number of iterations have been performed and the computation of an error rate value for the uplink traffic channel transmission exceeds the threshold error rate value.

40. The method of claim 39, wherein the step (A) further comprises the step of transmitting a fourth message to a mobile switching center of the network directing that a wireless communication be completed using the radio.

41. An apparatus for testing uplink traffic channel operation of a radio in a base station of a wireless communication network, comprising:

a detector for detecting a wireless communication in progress between the radio and a mobile station in the network;

a memory for storing data concerning selected call processing activities associated with wireless communications which may be collected at the base station during the course of a wireless communication between the radio and the mobile station;

a processor for computing a frame error rate for transmission on the uplink channel of the radio using the call processing activities data stored in the memory wherein the processor directs the detector to detect a wireless communication over the uplink traffic channel to a non-utilized mobile station in the network for a predetermined number of iterations if the first time that the computation is performed and each subsequent time that the computation is performed results in the computation of an error rate value which exceeds a threshold error rate value; and, an indicator for indicating that uplink traffic channel operation of the radio is not properly functioning if the predetermined number of iterations have been performed and the final computation error rate value exceeds the user set threshold error rate value.

42. A method for testing paging overhead channel operation of a radio in a base station of a wireless communication network, comprising the steps of:

(A) maintaining a time indexed record of each page message signal transmission by the radio to a destination mobile station;

(B) detecting whether a response is received from the destination mobile station;

(C) maintaining records of which mobile stations in the network were the destination mobile stations for page message signals transmissions and which mobile stations responded to page message signal transmissions;

(D) deleting the record corresponding to the circumstance where the destination mobile station did not respond to the page message signal transmission and that mobile station is the same as another mobile station that did not respond to an earlier page message signal transmission; and, (E) computing from the records when a preset number of records of page message signal transmissions are stored whether the number of page message signals not responded to exceeds a preset percentage of the total number of page message signals transmitted by the radio.

43. An apparatus for testing paging overhead channel operation of a radio in a base station of a wireless communication network, comprising:

a memory for maintaining a time indexed record of each page message signal transmission by the radio to a destination mobile station;

a detector for detecting whether a response is received from the destination mobile station; and, a processor for storing in the memory records of which mobile stations in the network were the destination mobile stations for page message signals transmissions and which mobile stations responded to page message signal transmissions in the memory, wherein the processor deletes the record from the memory corresponding to the circumstance where the destination mobile station did not respond to the page message signal transmission and that mobile station is the same as another mobile station that did not respond to an earlier page message signal transmission, and wherein the processor computes from the records when a preset number of records of page message signal transmissions are stored whether the number of page message signals not responded to exceeds a preset percentage of the total number of page message signals transmitted by the radio.

44. A method for testing a radio of a sector in a base station of a wireless communication network which operates over an overhead channel, comprising the steps of:

detecting a wireless communication in progress between the sector and a mobile station in the network;

collecting data concerning selected call processing activities during the course of the wireless communication between the sector and the mobile station;

processing the collected data values; and, comparing the processed data values to expected values for purposes of determining whether the radio is operating properly.

45. The method of claim 44, where the call processing activities data are collected for testing the operation of a paging channel of the radio.

46. An apparatus for testing a radio of a sector in a base station of a wireless communication network which operates over an overhead channel, wherein the network comprises a plurality of mobile stations, the apparatus comprising:

a detector for detecting a wireless communication in progress between the sector and the mobile station in the network, a memory for storing data concerning selected call processing activities which are collected during the course of a wireless communication between the sector and the mobile station;

a processor for processing the collected data values stored in the memory and comparing the processed data to expected values in order to determine whether the radio is operating properly; and, an indicator for indicating the operating condition of the radio.

47. The apparatus of claim 46, wherein the overhead channel tested is a paging channel.

48. A method for testing pilot overhead channel operation of pilot signal radios in a plurality of base stations, respectively, of a wireless communication network, wherein the network comprises a plurality of mobile stations, the method comprising the steps of:

providing a first message signal to each base station when a pilot test schedule indicates that data collection should be performed for a collection interval, wherein the first message signal directs a first radio in a sector, the sector including a pilot signal radio and a second radio engaging in a traffic channel wireless communication with a mobile station, to transmit a second message signal to the mobile station, wherein the first message signal further directs each base station to collect data concerning mobile accesses received from mobile stations, wherein the second message signal directs the mobile station to collect data concerning the identity of all pilot signals that the mobile station can detect and transmit the collected data in the form of a third message signal to a third radio in the radio group, storing in a memory in each base station data concerning mobile accesses received during the collection interval and the data received as part of the third message signals;

transmitting to a mobile switching center fourth message signals comprising data representative of the data stored in each base station for the collection interval;

determining from the data collected for the collection interval whether a pilot signal radio is potentially failing;

determining whether data was collected and stored in the memory for a collection interval that corresponds, in time, to a previous collection interval;

calculating the probability that a potentially failing pilot signal is indeed failing using data collected for the past collection interval; and, providing an indication whether a failure exists.

49. The method of claim 48, further comprising the step of:

revising the test schedule if insufficient data are being collected.

* * * * *